S. GRIMSON.
GLASS DRY CLEANSER.
APPLICATION FILED JUNE 11, 1910.
995,785.
Patented June 20, 1911.
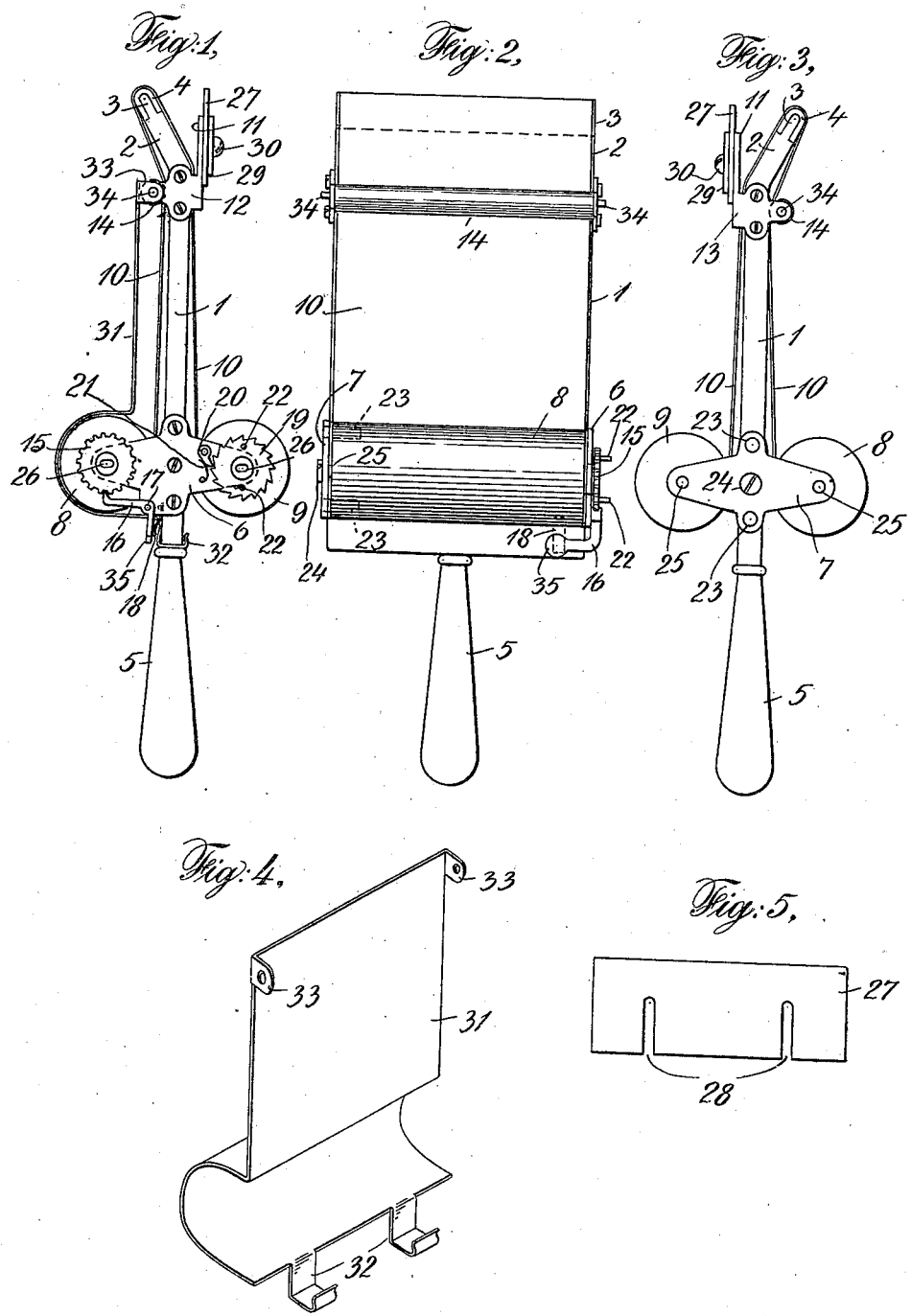

UNITED STATES PATENT OFFICE.

SAMUEL GRIMSON, OF NEW YORK, N. Y.

GLASS DRY CLEANSER.

995,785.  Specification of Letters Patent.  Patented June 20, 1911.

Original application filed March 12, 1910, Serial No. 548,790. Divided and this application filed June 11, 1910. Serial No. 566,464.

*To all whom it may concern:*

Be it known that I, SAMUEL GRIMSON, of the borough of Manhattan, in the city, county, and State of New York, have invented a new and useful Glass Dry Cleanser; and I hereby declare that the following is a full, clear, and exact description thereof, which will enable those skilled in the art to make and use the same, reference being had to the accompanying drawings, and to the characters of reference thereon, which form part of this specification.

It is very desirable, for many reasons, to be able to clean glass in windows, mirrors, picture frames, show cases and similar situations without the use of water or other liquids which are liable to drop or be spattered in the operation, and I have discovered a cleansing material by means of which this can readily, conveniently and rapidly be done, when such cleansing material is properly rubbed over the glass, mirror, etc., and all dirt, spots and other impurities removed from the surface of the glass.

In carrying out my invention, I have sought to obtain a cleansing body by means of which the use of water in cleansing glass could be avoided, and which would also be free from any other objection. For the purpose of using such a cleansing body it is desirable to have a suitable backing or support for the same by means of which it can readily and easily be pressed upon the glass surface and evenly rubbed upon the same and for that purpose I have invented a suitable device which may be readily used upon windows, mirrors, pictures, show cases and in other situations where the surface of the glass is required to be cleansed.

In washing windows, mirrors, etc., with water, alcohol, or other liquids, the liquid may be applied in any convenient manner and allowed to flow over a large surface to soften strongly adherent particles, and these then washed off and the glass dried and rubbed. But in cleansing glass with dry cleansing devices so that dressed show-windows, show cases, etc., may be cleansed without disarranging or soiling the merchandise, it is necessary to have means for loosening strongly adherent matters, and also to operate upon a comparatively narrow or small surface of the glass in order to produce satisfactory results. For this purpose I have invented a new and useful device which may be practically used.

The particular device described herein consists essentially of a suitable frame provided at one end with a rigidly attached handle, and at the other end with an adjustable scraper formed of suitably tempered steel (which I have discovered will not scratch the surface of glass,) and a thin part projecting angularly from the frame and arranged to support a cleansing band which is adapted while in a dry state to take up the dirt which is found upon the surface of the glass, and which is fitted with a compact resilient covering, such cleansing band support and such tempered steel scraper being disposed contiguous to each other and at such angles that by simply rotating the handle either one may be used at that part of the window or mirror where its use is found necessary, so that any strongly adherent matter may be quickly loosened by the scraper and taken up by the cleansing band. The support for such steel scraper is furthermore of such shape that it forms an inclosed path to keep the cleansing band near to one side of the frame and between such steel scraper and cleansing band support, and also forms side guides for the cleansing band by which sidewise movement of such band on its support is prevented; and it furthermore forms bearings for a roller to keep the cleansing band near to the frame on the other side; and in addition thereto suitable spools are disposed on such frame which are adapted to pay out and to take up such cleansing band, such spools being fitted with pawls and ratchets to keep the cleansing band at tension over the thin, angular part projecting from the frame.

I am aware that there are soft metals which will not scratch ordinary window glass, but such metals cannot be used to advantage for a scraper in my device, because soft metal is easily dented or nicked by particles of paint or varnish or other strongly adherent matter attached to the glass, and when so impaired picks up dirt which may be upon the glass and carries it along the surface, thereby smearing instead of cleaning the glass, which is not the case when a tempered steel scraper is used.

In the drawings presented herewith, an example of my invention is shown. In this Figure 1 is a view looking at the side of the device on which the ratchet and gear wheels are placed, showing the cover in position. Fig. 2 is a view of the under side of the device, the cover being removed. Fig. 3 is a view of the side of the device opposite to that shown in Fig. 1, the cover being removed and the thumb-piece 35 for the gear wheel not shown. Fig. 4 is a view of the cover. Fig. 5 is a view of a knife or scraper adapted to be used with the device.

Similar characters of reference indicate like parts in all of the drawings.

A suitable frame or support, 1, is prepared, which carries the glass dry cleanser in the form of a band, this frame may be made of wood or similar material, and is provided with a bent or curved end, 2, which terminates in a thinned part, 3, around which a covering of felt, 4, or similar resilient material may be secured. This resilient covering 4, should be quite yielding in order to impinge upon the surface of the glass, both where such surface is flat and where such surface is ondoyant or wavy, and also in order that it may not scratch or injure the putty on the window sash, and it should be of compact material having no sharp fibers or other points to pierce the cleansing band or injure the glass, and nothing that will catch on the ornamental projections frequently found along the inner edges of picture frames. To the other end of the frame, a suitable handle, 5, may be attached in any convenient manner. While only one form of handle is shown, a handle of any length or configuration may be employed depending upon the use to which the device is to be put.

On the frame, 1, near the handle, suitable plates, 6, 7, which may be of metal, are secured in any convenient manner as supports for the spools, 8, 9. The spool, 8, is the feed spool, upon which the cleansing band, 10, is to be wound, and from which it is fed; and the spool, 9, is the take up spool, on which the cleansing band, 10, is to be wound after the part thereof over the felt, 4, is too much soiled to be used.

Upon the frame, 1, and near its bent part, 2, a suitable metal strip, 11, is secured as by the ends thereof, 12, 13, which are bent around the edge of the frame, 1, and are there fastened by screws or nails. These bent over ends, 12, 13, form bearings also for a roller, 14, which rests snugly against the under face of the frame, 1; and the lower edge of the metal piece, 11, rests snugly against the other face of the frame, 1, the roller, 14, and the lower edge of the piece, 11, acting as guides to keep the cleansing band, 10, near the angular part, 2, and the inner sides of the pieces, 12, 13, acting as guides to prevent sidewise movement of the cleansing band when in use as it rests upon and passes over the resilient part 4 at the end of the angular part 2.

The cleansing band, 10, is drawn from the feed spool, 8, under the roller, 14, around the resilient edge, 4, thence under the strip, 11, and is then secured to the take up spool, 9. It is desirable to keep the cleansing band in tension, so that it may be employed at the resilient edge, 4, in cleansing, and held in place there until that portion of it is too much soiled for use. In order to accomplish this, any suitable stretching device may be employed. In the present device the feed spool, 8, is provided at one end with a gear wheel, 15, which is kept from turning by the pawl, 16. This pawl is pivoted at 17, and held in place to engage the wheel 15, by a spring, 18. When it is desired to rotate the feed spool, 8, to pay out the cleansing band, 10, the operator presses upon the free end or thumb piece, 35, of the pawl, 16, and thereby draws it out of engagement with the gear, 15, allowing the feed spool to rotate. The take up spool, 9, is provided with a ratchet wheel, 19, held in engagement by a click, 20, and spring, 21. This ratchet wheel is provided with suitable means for rotating it conveniently, as the projecting pins, 22, 22. When the gear, 15, is released from the pawl, 16, so that the cleansing band may be paid out, the operator rotates the ratchet, 19, to take up so much of the cleansing band as has been soiled at the point, 4, and then releases the pawl, 16, and the take up spool, when the cleansing band is again held taut in place.

The bearing, 7, for the free ends of the spools, 8, 9, is adjustable to the frame, 1, as by pins, 23, 23 which fit into openings in the frame 1, and the screw, 24, which screws into the frame, 1; so that the spools may be drawn out sidewise and the soiled cleansing band, when entirely used up, may be removed, and a fresh band inserted. The spools, 8, 9, at their free ends have round pintles, 25, 25, but at their ends engaging respectively with the collar, 26, of the gear, 15, and the collar, 26, of the ratchet 19, the pintles are oval or flattened to take into corresponding openings in the collars, 26, 26, of the gear and ratchet.

The part of the cleansing band, 10, at the point, 4, of the device, is sufficient to cleanse glass quickly and rapidly from all ordinary soiling, but it sometimes happens that paint, varnish or some other strongly adherent substance has become attached to the glass. While the cleansing band itself would remove such soilings if rubbed over them long enough, they can be more quickly loosened from the surface of the glass in the first instance by scraping them off. For this purpose a scraping part is provided. This consists of a strip of tempered steel, 27, which, I have discovered, is a metal that will not scratch the surface of the glass. This scraper, 27, is made adjustable, so that it may be raised or lowered or turned when one angular edge has been dulled, as shown in Fig. 5, by means of the slots, 28, 28, and is secured to the strip, 11, by means of a suitable piece, 29, and screws, 30, 30, which pass through the slots in the scraper, 27, and take into the strip, 11. When such strongly adherent matters have been removed by the scraper, a few rubbings of the cleanser over the spots will quickly remove all traces of them. This tempered steel scraper, 27, should be disposed at the end of the frame, 1, opposite to the end having the handle, 5, and adjacent to the part carrying the cleansing band, in order that it may be in position to be quickly applied where it is to be used, but it should also be out of the way of the cleansing band portion of the device, so that either may be readily used at the same point where the other is employed.

In order to protect the clean portion of the band, 10, from soiling, a cover, 31, of any suitable material, as of tin, may be adapted to fit that side of the cleanser—this may be provided with ears, 33, 33, to take in the pintles, 34, 34, which hold the roller, 14, in place, and which project sufficiently to take in the ears, 33, and support the cover, 31. The other edge of the cover, 31, may be provided with snaps, 32, 32, to take in the lower edge of the frame, 1, as shown in Fig. 1.

The surface of glass is more or less ondoyant and wavy and in that sense uneven, and it is therefore desirable to operate upon only a comparatively small portion thereof at a time, in order to avoid exerting too much pressure upon the pane at once; it is also important to have no hard or sharp part of the cleaning device at the points where it passes near the edge of the pane, both in window sashes and in picture frames, which would be liable to scrape and injure the putty that holds the glass in place or the ornamental devices on the inner edge of picture frames, and in this device the soft compact covering 4, of the angular projection 2, carries the cleansing band safely along the edge of the putty or the ornamental projections without danger of injuring the same.

By means of this backing or support which is rigidly secured to its handle, the dry cleansing device may be very conveniently used upon glass surfaces in any position, and will be found especially convenient for use on the interior surfaces of show windows, show cases, etc., and may be evenly rubbed over the same so as to reach every portion of such surfaces; but I do not here-in make claim to any special composition adapted to cleanse glass in a dry state or without water, although such cleansing substances are included in the scope of my original application filed March 12, 1910, Serial No. 548,790, of which this is a divisional application.

Having thus described my invention, what I claim as new, and desire to secure by Letters Patent, is—

1. A glass dry cleansing device of the character described, including a suitable frame, a handle rigidly fixed at one end thereof, a thin angular part at the other end covered with a yielding compact material, a support disposed contiguous to such angular part, a spool disposed at a point on such frame adapted to receive and pay out a suitable cleansing band, a spool disposed at another point on such frame adapted to receive and take up such cleansing band, a cleansing band passing from such paying out spool along the frame toward and over the angular projecting part and between the same and the support on to the take up spool, in combination with a suitable bent over part disposed below the angular portion of such frame, such bent over part having ears at one side adapted to support a roller disposed to keep the cleansing band near the frame, a projecting part at the other side adapted to support a scraper, and forming a guide adapted to permit the passage of the cleansing band and keep the same near the side of the frame and prevent sidewise movements on the thin angular projecting part, and suitable devices connected with said spools adapted to keep the cleansing band at tension over such angular projecting part.

2. In a glass dry cleansing device of the character described, a frame provided with a thin angular projecting part covered with a compact yielding material, a support adapted to hold a suitable scraper and also to guide a cleansing band, in combination with a suitable cleansing band movably supported on such frame, and held in place at tension over such compact yielding material and beneath such support.

3. In a glass dry cleansing device of the character described, a frame provided with a suitable handle rigidly fixed at one end, an angular projecting part at the other end, a support disposed adjacent to such angular projecting part, in combination with a cleansing band disposed on such frame and suitable devices adapted to guide said cleansing band between such support and angular projecting part, and hold the same at tension and against sidewise movement on such angular projecting part.

4. In a glass dry cleansing device of the character described, a suitable frame provided with an angular projecting part having a yielding portion and a support, in combination with a bent over portion disposed on such frame and adapted to form a support for a steel scraper, said frame and support forming an inclosed path to keep the cleansing band near the frame and to guide such cleansing band from sidewise movement on the angular projecting part, and a roller adapted to keep such cleansing band near the frame in its movements over the angular projecting part.

SAMUEL GRIMSON.

Witnesses:
 JOHN T. C. VAN DERVEER,
 THEODORE MORRIS.

Copies of this patent may be obtained for five cents each, by addressing the "Commissioner of Patents, Washington, D. C."